United States Patent [19]

Cozewith et al.

[11] 3,779,944

[45] *Dec. 18, 1973

[54] BUTADIENE POLYMERIZATION CATALYST

[75] Inventors: Charles Cozewith, Westfield; Erik G. M. Tornqvist, Roselle, both of N.J.

[73] Assignee: Esso Research and Engineering Company, Linden, N.J.

[*] Notice: The portion of the term of this patent subsequent to May 16, 1989, has been disclaimed.

[22] Filed: Aug. 27, 1971

[21] Appl. No.: 175,758

Related U.S. Application Data

[63] Continuation of Ser. No. 788,908, Jan. 3, 1969, Pat. No. 3,642,758.

[52] U.S. Cl. ............................ 252/429 B, 260/94.3
[51] Int. Cl. .............................................. C08d 1/14
[58] Field of Search ................. 260/94.3; 252/429 B

[56] References Cited
UNITED STATES PATENTS

| | | | |
|---|---|---|---|
| 3,471,461 | 10/1969 | Tornqvist | 252/429 C |
| 3,441,551 | 4/1969 | Jezl | 252/429 B |
| 3,129,209 | 4/1964 | Hague et al. | 252/429 B |
| 3,663,450 | 5/1972 | Cozewith et al. | 252/429 B |

*Primary Examiner*—Patrick P. Garvin
*Attorney*—Leon Chasan et al.

[57] ABSTRACT

Process utilizing Ziegler-type catalyst system for polymerizing butadiene to high molecular weight polybutadienes possessing varying proportions of trans-1,4 units, in the range of 50–90 percent comprising: an organoaluminum compound, a Lewis base, and a $Ti(halogen)_3 \cdot nAlI_3$ composition. The polymers thus obtained exhibit outstanding properties as elastomers when cross-linked and as thermo-elastic polymers in the uncured state.

6 Claims, No Drawings

BUTADIENE POLYMERIZATION CATALYST

CROSS REFERENCE

This application is a continuation of U.S. Ser. No. 788,908, filed Jan. 3, 1969, now U.S. Pat. No. 3,642,758.

BACKGROUND OF THE INVENTION

1. Field of the Invention

This invention relates to a catalyst system and a process for using the same, useful for the stereospecific polymerization of butadiene. More specifically, the catalyst comprises an organoaluminum compound, a Lewis base, and a Ti (halogen)$_3$·nAlI$_3$ composition, hereinafter denoted as TiX$_3$·nAlI$_3$, obtained by fusion or by co-crystalization or intimate mixing as by grinding of the components. This catalyst system is used especially in the production of polybutadienes in which the ratio of trans-1,4 to cis-1,4 units can be varied over wide limits and especially within the particularly desirable trans-1,4 range of 50 to 90 percent.

2. Description of the Prior Art

Ziegler-type multi/component catalyst systems such as transition metal halides combined with organometallic compounds have been known for well over a decade. The ability of such catalyst to polymerize butadiene to elastomeric products has also been recognized, but the polymers thus produced have generally been characterized by a high cis-1,4 content rather than trans-1,4 addition units. Thus, for example copending application Ser. No. 408,405, filed Nov. 2, 1964, now U.S. Pat. No. 3,471,461, discloses the use of TiX$_3$·nAlI$_3$-xAl(alkyl)$_3$ catalyst systems for the polymerization of butadiene, in which the steric arrangement of the resulting polybutadiene is predominantly cis-1,4.

Other catalysts, particularly based on vanadium compounds, capable of producing polybutadienes containing more than 90 percent trans-1,4 addition units have also been developed, but the polymers thus produced have been characterized by resinous or plastic rather than elastomeric properties.

The prior art also contains a number of references which disclose that the addition of Lewis bases to certain catalyst systems which normally produce high cis-1,4 polybutadienes, causes a decrease in the cis-1,4 units and an increase in the trans-1,4 units in the polymer. However, all of these systems employ titanium tetrahalides rather than trihalides, and the addition of the Lewis base is always accompanied by a drastic decrease in the polymerization rate and the catalyst efficiency.

The inventors have now found surprisingly that the addition of certain Lewis bases to the catalyst system comprised of an Al(alkyl)$_3$ hereinafter referred to as AlR$_3$ and a TiX$_3$·nAlI$_3$ composition causes a decrease in the cis-1,4 addition of the butadiene monomer and a corresponding increase in the trans-1,4 addition without the catalyst efficiency being adversely affected to any significant extent. They have also found that the novel catalyst system is capable not only of efficiently producing polybutadienes containing larger proportions of trans-1,4 addition units than those catalysts disclosed in the prior art, but also of producing predominantly elastomeric polybutadienes containing 50-90 percent of such units. This is a particularly surprising and significant discovery, since polymers of corresponding over-all compositions which have been prepared in the past with the help of other catalysts or polymerization methods have generally exhibited a considerable amount of crystallinity and plastic character. While the inventors do not wish to be bound by any particular explanation for the difference in physical properties between the 50–90 percent trans-1,4 polybutadienes prepared according to this invention and those of the prior art, it is believed that the much more elastomeric character of the former is the consequence of a more random distribution of the cis-1,4 and trans-1,4 units in the polymer molecules than in the polymers heretofore known.

The purpose of this invention therefore is to describe a new catalyst system for controlling the steric configuration of 1,4 addition units in polymers of conjugated dienes, the process for employing same to produce such dienes and in particular to describe this polybutadiene having predominantly elastomeric properties.

SUMMARY OF THE INVENTION

In general, this invention relates to a catalyst system broadly belonging to the Ziegler Group, consisting of a partially reduced salt mixture corresponding to the formula TiX$_3$·nAlI$_3$, where $n$ may represent a value between about 1 and 20, an aluminum trialkyl, and certain Lewis bases. It also relates to the use of said Ziegler type catalysts for the polymerization of conjugated diolefins, butadiene-1,3 in particular, to polymers of attractive and practically valuable properties. While the use of the system comprising TiX$_3$·nAlI$_3$-xAlR$_3$ for producing high cis-polybutadienes was described in the previously mentioned U.S. Pat. No. 3,471,461, it has now been discovered that the modification of said basic catalyst system by the addition of a suitable Lewis base will cause the type of butadiene addition in the polymer to change from predominantly cis-1,4 to trans-1,4, up to about 90 percent of the latter type depending on the level and character of the Lewis base addition. As a general rule, it may be said that the higher the concentration of the Lewis base in the catalyst mixture, the higher will be the trans-1,4 content of the polymer until a certain upper limit has been reached.

The Lewis bases that may be used are heterocyclic thia, aza and oxa compounds, specifically cyclic thioethers, cyclic ethers, and their derivatives. Such compounds include tetrahydrothiophene, tetrahydrothiopyran, tetrahydrofuran, tetrahydropyran, 2,5-dimethyl tetrahydrofuran, 3-phenyl tetrahydrofuran, 3-ethyl 4-propyl tetrahydrofuran, 2,5-dimethyl 3-chloro tetrahydrofuran, 2-methyl tetrahydrothiophene, 3-phenyl tetrahydrothiophene, 3-ethyl 4-propyl tetrahydrothiophene and 2,5-dimethyl 3-chloro tetrahydrothiopyran. Particularly preferred among these compounds is tetrahydrothiophene, however, other cyclic thioethers may also be advantageously employed.

The organoaluminum compounds that can be advantageously used for making the catalysts of this invention are trialkylaluminums, such as trimethyaluminum, triethylaluminum, triisobutylaluminum, trihexylaluminum, triisophenylaluminum, etc. Mixtures of trialkylaluminums and dialkylaluminum halides and alkoxides may also be successfully employed. Among suitable dialkylaluminum compounds to be used in conjunction with trialkylaluminums may be mentioned dialkylaluminum halides, particularly dialkylaluminum iodides, dialkylaluminum alkoxides, etc.

The hydrocarbon diluents used in making the polybutadiene of the present invention should be liquids at the conditions of temperature and pressure used in the polymerization reaction. Suitable diluents include $C_4$ to $C_{10}$ saturated aliphatic or cycloaliphatic hydrocarbons, such as butane, petane, n-heptane, isoctane, n-decane, cyclohexane, methylcyclohexane, etc. and aromatic compounds such as benzene, toluene, xylene, tetraline, isopropyl benzene, etc.

The process of this invention comprises two principal steps. First, the intimate salt mixture comprising $TiX_3$ and $AlI_3$, which may be of a cocrystalline or solid solution character and is preferably prepared by fusion or intense grinding, essentially as described in U.S. Pat. No. 3,471,461, is added to and dissolved in all or part of the reaction diluent. The final complete catalyst useful for polymerizing butadiene is then prepared by contacting the dissolved salt mixture with the organoaluminum component and the Lewis base, said contacting being preferably carried out in the presence of the diene monomer which may have been added either directly or in solution in another part of the reaction diluent.

While the $TiX_3 \cdot nAlI_3 \text{-} xAlR_3$, and Lewis base may be combined in many different ways to produce an active polymerization catalyst, a particularly preferred embodiment of this invention involves first adding the solid $TiX_3 \cdot nAlI_3$ component in all or part of the polymerization diluent or solvent, then adding the monomer and finally adding the $AlR_3$ and the Lewis base. Alternatively, the $TiX_3 \cdot nAlI_3$ may be added to the polymerization diluent containing the monomer whereupon the $AlR_3$ and the Lewis base may be added to form the complete catalyst and start the polymerization. Although the Lewis base may be successfully added before the trialkylaluminum, better results are usually obtained if the Lewis base is added either together with or after the trialkylaluminum, especially when the base is to be employed in the rather large concentrations required for production of polymers containing a predominant amount of trans-1,4 units. In such cases the base seems to interfere with and slow down the reaction between the alkyl-metal and the $TiX_3 \cdot nAlI_3$ component required for formation of the catalytically active species. By properly utilizing the latter mode of base addition, i.e. by adding the base after the polymerization has been initiated with the unmodified $TiX_3 \cdot nAlI_3 xAlR_3$ catalyst system, it may actually be possible to obtain A-B type block copolymers in which first (A) block has the high cis-1,4 structure characteristic of the polybutadienes made with the unmodified catalyst system and the second (B) has the higher trans-1,4 structure characteristic of the polybutadienes made with the modified catalyst system. In this instance and in subsequent use, the term "modifier" refers to the Lewis base. On the other hand, if the Lewis base is added immediately after the $AlR_3$, the polymerization may be initiated rapidly without any significant amount of rather pure cis-1,4 polybutadiene blocks being formed. Hence, this method is particularly suitable for the production of high trans-1,4 polybutadiene.

The conditions of the polymerization reaction can vary over a wide range. Generally, temperatures ranging from less than 0°C. to about 100°C can be used; however, temperatures ranging from 4 to 70°C. are preferred. Pressures ranging from subatmospheric to about 10 atmospheres can be employed depending primarily upon the vapor pressure of the diene and diluent in the polymerization reaction. A preferred range would, however, be from atmospheric to about 5 atmospheres. Reaction times ranging from a minute to 250 hours can be utilized depending primarily on the time needed for the desired monomer conversion under the polymerization conditions used; however, it is usually possible to achieve close to the maximum conversion obtainable in 24 hours or less.

The reaction vessel used for the polymerization can be constructed from any material that is inert to the reactants and is capable of withstanding the operating pressures. Reactors made of glass, stainless steel and glass lined steel may thus be employed.

The total amount of catalyst employed in the polymerization of butadiene may vary within rather wide limits depending upon the particular conditions of the polymerization, but is generally in the range of from about 0.001 to about 0.3 wt. %, preferably 0.01 to 0.1 wt. % based upon the total reaction mixture comprising the butadiene monomer to be polymerized and the reaction diluent.

The molar ratio of $TiX_3$ to $AlI_3$ employed in preparing the intimate salt mixture can vary within a wide range from about 1:1.0 to about 1:20. The preferred range however for this ratio is from 1:2 to 1:10.

As in the case of the unmodified $TiX_3 \cdot nAlI_3 xAlR_3$ catalyst disclosed in U.S. Pat. No. 3,471,461, the molar ratio between the trialkylaluminum and the $AlI_3$, i.e. $x/n$, is rather critical, although not quite as critical as for the unmodified catalyst, and should be between 5:1 and 1:1, and preferably between 3:1 and 1.4:1. It is believed that the lower sensitivity of the Lewis base modified catalyst system to higher $AlR_3/AlI_3$ ratios is the consequence of the inhibiting effect which the Lewis base apparently exerts upon the reaction between the two basic components required for formation of the catalytically active species. Hence, higher $AlR_3/AlI_3$ ratios can be employed especially when the base is added before or simultaneously with the alkylmetal. On the other hand, higher $AlR_3/AlI_3$ ratios, above about 5, will eventually lead to deactivation of the catalyst and usually before complete monomer conversion has been accomplished. Such ratios are not particularly recommended, therefore. The optimum ratio, which can be ascertained through text experimentation, also tends to increase with decreasing amounts of $AlI_3$ in the solid compound, i.e. with decreasing $n$.

The ratio of Lewis base to titanium in the catalyst mixture controls the steric arrangement of the monomer units in the resulting polybutadiene and, in general, the greater the concentration of Lewis base employed, the higher the trans-1,4 content in the polymer up to a certain upper limit. The molar ratio of Lewis base to titanium compound may vary from 1:1 to 500:1 depending upon the amount of trans-1,4 structural units desired in the polybutadiene.

Upon completion of the polymerization the catalyst is deactivated by the addition of a small quantity of a suitable deactivating agent, such as a lower alkanol or a solution of an alkoxide of an alkali or alkaline earth metal, e.g. sodium isopropoxide, sodium ethoxide, potassium t-butoxide, etc. The polymer formed may be recovered from the polymerization mixture by standard techniques such as removal of the diluent by steam distillation or by addition of an anti-solvent to precipitate the polymer. The solid polymer obtained is then isolated by filtration, centrifugation, or similar methods.

The molecular weights, expressed as viscosity average m.w., of the butadiene polymers of the present invention range upwards from 100,000 and preferably from 150,000 to 3,000,000. The butadiene polymers contain reactive unsaturation and may be cured to form highly useful vulcanized materials of varying properties. Any one of a wide variety of curing procedures may be employed, such as sulfur curing or free radical curing.

In the uncured state, the instant buatdiene polymers exhibit tensile strengths of the order of 150 to 2,000 psi., with percent elongation up to about 1,300. The percent permanent set after breaking ranges from about 25 to about 300 percent.

In the cured state, the instant butadiene polymers exhibit tensile strengths of the order of 1,200 to 2,500 psi., with percent elongation up to about 900.

Examples 1–12

A number of butadiene polymerizations were carried out with tetrahydrothiophene (THT) modified $TiCl_3 \cdot nAlI_3 x AlEt_3$ catalysts inside a nitrogen containing dry box in capped ½ gallon glass jars equipped with magnetic stirrers. THT and $AlEt_3$ were added together as a mixture of the 1 molar solutions after the solid catalysts component and the monomer had been added to the diluent. The detailed experimental conditions and the results of the polymerizations are reported in Table I.

The data in Table I clearly demonstrate the striking effect of THT addition of the molecular structure (isomer composition) of the polymer and show that polymers containing more than 85 percent trans unsaturation can be obtained in good yields with sufficiently high contents of Lewis base. (See examples 5, 6, 8 and 12).

TABLE I.—EFFECT OF TETRAHYDROTHIOPHENE ON BUTADIENE POLYMERIZATION

| Examples | (100g butadiene-1,3;500 cc benzene) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Catalyst: | | | | | | | | | | | | |
| $TiCl_3 \cdot nAlI_3$: | | | | | | | | | | | | |
| Composition, n = | 3 | 3 | 3 | 3 | 3 | 3 | 5 | 5 | 5 | 10 | 10 | 10 |
| Weight, mg | a86 | a86 | a86 | b172 | b172 | c344 | d219 | d219 | e439 | a264 | a264 | a264 |
| $AlEt_3$, mg[f] | 38.5 | 38.5 | 38.5 | 77 | 77 | 154 | 103 | 103 | 205 | 143 | 143 | 143 |
| THT, mg[f] | | 166 | 331 | 441 | 882 | 882 | 265 | 705 | 529 | 331 | 551 | 827 |
| $AlEt_3/AlI_3$ molar ratio | 1.8 | 1.8 | 1.8 | 1.8 | 1.8 | 1.8 | 1.8 | 1.8 | 1.8 | 2 | 2 | 2 |
| $THT/TiCl_3$ molar ratio | 0 | 30 | 60 | 40 | 80 | 40 | 30 | 80 | 30 | 60 | 100 | 150 |
| Total reaction time, hrs[g] | 19 | 19 | 19 | 18 | 165 | 163 | 18 | 21 | 18 | 20 | 66 | 67 |
| Results: | | | | | | | | | | | | |
| Polymer yield, g | 89.7 | 79.5 | 78.7 | 78.2 | 64.7 | 78.5 | 90.0 | 75.0 | 82.1 | 84.7 | 90.0 | 75.4 |
| Polymer mol. wt. × $10^{-3\,h}$ | 355 | 380 | 440 | 275 | 245 | 295 | 340 | 410 | 115 | 135 | 340 | 510 |
| Polymer unsaturation: | | | | | | | | | | | | |
| Vinyl, percent | 4.7 | 4.4 | 3.7 | 2.9 | 2.5 | 2.4 | 4.5 | 2.4 | 3.9 | 5.4 | 4.0 | 2.8 |
| Cis, percent | 90.6 | 55.8 | 30.7 | 22.4 | 9.3 | 10.7 | 55.6 | 12.3 | 34.3 | 46.4 | 24.6 | 9.8 |
| Trans, percent | 4.7 | 39.8 | 65.6 | 74.7 | 88.2 | 86.9 | 39.9 | 85.3 | 61.8 | 48.2 | 71.4 | 87.4 |

[a] Corresponds to 9.64 mg = 0.0625 mmole $TiCl_3$.
[b] Corresponds to 19.3 mg = 0.125 mmole $TiCl_3$.
[c] Corresponds to 38.6 mg = 0.25 mmole $TiCl_3$.
[d] Corresponds to 15.4 mg = 0.1 mmole $TiCl_3$.
[e] Corresponds to 30.9 mg = 0.2 mmole $TiCl_3$.
[f] $AlEt_3$ and THT were premixed before being added to the reaction mixture.
[g] Complete reaction frequently occurred within a period of time much shorter than that indicated in the table.
[h] According to the correlation of Johnson and Wolfangel for cis — 1,4—polybutadiene, Ind. Eng. Chem. 44, 752 (1952).

The polymers of this invention have many varied uses. They may be employed in the preparation of tires, inner tubes, hose and tubing, wire and cable coatings, as well as for a wide variety of coated or molded articles. Those polymers having from 70–90 percent trans unsaturation are particularly suitable for the preparation of injection-molded articles and possess thermoelastic properties.

DESCRIPTION OF PREFERRED EMBODIMENTS

This invention and its advantages will be better understood by reference to the following examples.

Examples 13–23

The following series of polymerizations were carried out in dried 8 oz. bottles which were charged under nitrogen in the following order: benzene, $TiCl_3 \cdot nAlI_3$, benzene-butadiene solution, Lewis base (tetrahydrothiophene or tetrahydrofuran) and $AlEt_3$. After the $AlEt_3$ addition, the bottles were capped and the reaction allowed to proceed at room temperature.

The results of the polymerizations are given in Table II. These data clearly demonstrate the wide variation in polymer steric structure obtainable with the instant catalyst system when the Lewis base is added prior to the aluminum alkyl.

TABLE II.—EFFECT OF LEWIS BASES ON BUTADIENE POLYMERIZATION

| Examples | (15g butadiene-1,3;130 cc benzene, 0.05 mmol $TiCl_3 \cdot nAlI_3$) | | | | | | | | | | |
|---|---|---|---|---|---|---|---|---|---|---|---|
| | 13 | 14 | 15 | 16 | 17 | 18 | 19 | 20 | 21 | 22 | 23 |
| Catalyst: | | | | | | | | | | | |
| $TiCl_3 \cdot nAlI_3$: | | | | | | | | | | | |
| Composition, n = | 2 | 2 | 3 | 3 | 3 | 3 | 5 | 5 | 3 | 3 | 3 |
| Weight, mg | 48.5 | 98.5 | 68.8 | 68.8 | 68.8 | 68.8 | 109.5 | 109.5 | 68.8 | 68.8 | 68.8 |
| $AlEt_3$, mg[a] | 20.0 | 20.0 | 34.2 | 34.2 | 34.2 | 34.2 | 45.6 | 45.6 | 34.2 | 34.2 | 34.2 |
| THT, mg | 85.6 | 143.0 | 44.0 | 132.0 | 176.0 | 220.0 | 184.6 | 308.0 | | | |
| THF, mg | | | | | | | | | 32.4 | 34.2 | 36.0 |
| $AlEt_3/AlI_3$ molar ratio | 1.75 | 1.75 | 2 | 2 | 2 | 2 | 1.6 | 1.6 | 2 | 2 | 2 |
| THT or $THF/TiCl_3$ molar ratio | 19.5 | 32.5 | 10 | 30 | 40 | 50 | 42 | 70 | 9 | 9.5 | b10 |
| Total reaction time, hrs | 20 | 20 | 20 | 20 | 20 | 20 | 20 | 20 | 20 | 20 | 20 |

TABLE II.—Continued

| | (15g butadiene-1,3;130 cc benzene, 0.05 mmol TiCl₃·nAlI₃) | | | | | | | | | | |
|---|---|---|---|---|---|---|---|---|---|---|---|
| Examples | 13 | 14 | 15 | 16 | 17 | 18 | 19 | 20 | 21 | 22 | 23 |
| Results: | | | | | | | | | | | |
| Polymer yield, percent | 76 | 72 | 68 | 64 | 60 | 52 | 79 | 78 | 91 | 48 | 8 |
| Polymer mol. wt. × 10⁻³ᶜ | 190 | 190 | 177 | 116 | 145 | 130 | 105 | 75 | 225 | 360 | 345 |
| Polymer unsaturation: | | | | | | | | | | | |
| Vinyl, percent | 3.9 | 3.1 | 4.7 | 5.0 | 4.2 | 2.8 | 2.8 | 2.0 | 3.9 | 2.0 | 2.1 |
| Cis, percent | 13 | 8 | 73 | 12 | 8.9 | 6.8 | 8.3 | 6.6 | 85 | 30 | 18 |
| Trans., percent | 83 | 89 | 23 | 84 | 87 | 90 | 89 | 91 | 11 | 68 | 80 |

ᵃ Added after the Lewis base.
ᵇ Corresponds to a THF/(Total Al-Ti) molar ratio of 1.
ᶜ According to the correlation of Johnson and Wolfangel for cis–1,4–polybutadiene, Ind. Eng. Chem. 44, 752 (1952).

Examples 24–27

While most of the catalysts reported in the foregoing examples will cause very rapid polymerization of the butadiene monomer, a delay in the initiation of the polymerization reaction is sometimes noticed at the high Lewis base levels required for the production of high trans unsaturation polymer if the base is added either before or together with the trialkylaluminum component. That this problem can be largely overcome was demonstrated in a series of experiments in which the Lewis base was added immediately (within about 5–10 seconds) after the AlEt₃.

Since unmodified TiCl₃·nAlI₃-xAlR₃ catalysts polymerize butadiene very rapidly at the concentrations required for making polymers in the molecular weight range of about 100–500 × 10³, the polymerization will be initiated almost immediately after the alkylaluminum addition. The polymer formed under these conditions will, of course, be of the high cis-1,4 type; however, as soon as the base is added the character of the monomer addition will change in the manner previously disclosed. Hence, if the Lewis base addition is made shortly after the polymerization has been initiated, most of the polymer will be of the type which results when the Lewis base is added simultaneously with or before the trialkylaluminum. This fact is clearly brought out by the data reported in Table III.

It should be noted that most of the polymerizations reported in the table had gone to completion within 2–4 hours after the THT addition. This was, for instance, the case in Example 26 where a polymer containing 87.2 percent trans unsaturation was obtained in close to 80 percent yield.

TABLE III

EFFECT OF TETRAHYDROTHIOPHENE ON BUTADIENE POLYMERIZATION (100g. butadiene-1,3; 500 cc benzene)

| Examples | 24 | 25 | 26 | 27 |
|---|---|---|---|---|
| Catalyst TiCl₃·nAlI₃ | | | | |
| Composition, n = | 3 | 3 | 3 | 5 |
| Weight, mg | 172ᵃ | 276ᵇ | 276ᵇ | 329ᶜ |
| AlEt₃, mg | 77 | 123 | 123 | 154 |
| THT, mgᵈ | 551 | 617 | 882 | 794 |
| AlEt₃/AlI₃ molar ratio | 1.8 | 1.8 | 1.8 | 1.8 |
| THT/TiCl₃ molar ratio | 50 | 35 | 50 | 60 |
| Total Reaction Time, hr.ᵉ | 18 | 19 | 19 | 43 |
| Results | | | | |
| Polymer Yield, g. | 71.6 | 86.7 | 79.7 | 82.8 |
| Polymer Mol. Wt. ×10⁻³ᶠ | 260 | 192 | 205 | 390 |
| Polymer Unsaturation | | | | |
| Vinyl, % | 2.5 | 3.0 | 2.7 | 2.5 |
| Cis, % | 14.1 | 19.3 | 10.1 | 14.0 |
| Trans, % | 83.4 | 77.7 | 87.2 | 83.5 |

ᵃCorresponds to 19.3 mg–0.125 mmole TiCl₃
ᵇCorresponds to 30.9 mg–0.2 mmole TiCl₃
ᶜCorresponds to 23.1 mg–0.15 mmole TiCl₃
ᵈAdded immediately after the AlEt₃
ᵉSee Table I, footnote (g)
ᶠSee Table I, footnote (h)

Examples 28–35

A series of butadiene polymerizations were carried out with THT modified TiI₃·3AlI₃-xAlEt₃ catalysts inside a nitrogen containing dry box in capped ½ gallon glass jars equipped with magnetic stirrers. The results reported in Table IV again clearly demonstrate the strong effect of THT addition on the polymer molecular structure. It should be noted also that good polymer yields were obtained at rather high AlEt₃/AlI₃ ratios with these THT modified catalysts (Examples 32, 33 and 35), indicating that the modified catalysts are less sensitive to variation in the AlR₃/AlI₃ ratio than the unmodified ones, at least when the AlR₃ and THT are added simultaneously. Actually, it was noted in the experiments reported in Table IV, as well as in other experiments of similar type, that an increase in the AlR₃/AlI₃ ratio from about 2 to about 3 helped to speed up the initiation of the polymerization reaction, which tends to be slowed down by the Lewis base if the latter is added before or simultaneously with the AlR₃. It was also noted that the initiation could be speeded up even further by employing AlR₃/AlI₃ ratios as high as 5. However, in these cases, the polymerization usually ceased after a certain period of time and well before complete conversion of monomer to polymer had taken place.

It should also be noted that while good polymer yields may be obtained at AlR₃/AlI₃ ratios up to a value of about 5, the amount of trans unsaturation in the polymer decreases with increasing AlR₃/AlI₃ ratio for the same THT/TiX₃ level. Thus, it may also be disadvantageous to employ high AlR₃/AlI₃ ratios ( > about 3) from this point of view.

TABLE IV.—EFFECT OF TETRAHYDROTHIOPHENE ON BUTADIENE POLYMERIZATION (100g. butadiene-1.3; 500 cc benzene)

| Example | 28 | 29 | 30 | 31 | 32 | 33 | 34 | 35 |
|---|---|---|---|---|---|---|---|---|
| Catalyst: | | | | | | | | |
| $TiI_3 \cdot 3AlI_3$, mg | a207 | 207 | 207 | 207 | 207 | 207 | 207 | 207 |
| $AlEt_3$, mg[b] | 77 | 77 | 77 | 86 | 114 | 143 | 214 | 114 |
| THT, mg[b] | 0 | 220 | 331 | 220 | 220 | 220 | 220 | 661 |
| $AlEt_3/AlI_3$ molar ratio | 1.8 | 1.8 | 1.8 | 2 | 2.67 | 3.33 | 5 | 2.67 |
| $THT/TiI_3$ molar ratio | 0 | 20 | 30 | 20 | 20 | 20 | 20 | 60 |
| Total reaction time, hrs,[c] | 20 | 21 | 21 | 20 | 19 | 19 | 20 | 140 |
| Results: | | | | | | | | |
| Polymer yield, g | 89.8 | 93.5 | 62.0 | 86.9 | 88.8 | 75.1 | 37.7 | 92.2 |
| Polymer mol. wt. × $10^{-3}$ | 235 | 160 | 295 | 425 | 310 | 290 | 150 | 460 |
| Polymer unsaturation: | | | | | | | | |
| Vinyl, percent | 5.0 | 3.7 | 2.9 | 4.8 | 7.0 | 11.4 | 11.6 | 4.7 |
| Cis, percent | 86.1 | 52.9 | 32.3 | 64.2 | 56.2 | 64.4 | 73.1 | 14.7 |
| Trans, percent | 8.9 | 43.4 | 64.8 | 31.0 | 36.8 | 24.2 | 15.3 | 80.6 |

[a] Corresponds to 53.6 mg = 0.125 mmole $TiI_3$.
[b] See Table I, footnote [f].
[c] See Table I, footnote [g].
[d] See Table II, footnote [c].

Examples 36–38

To demonstrate more generally the usefulness of other Lewis bases for modifying $TiX_3 \cdot nAlI_3$-$xAlR_3$ catalysts according to the method of this invention, three polymerizations were carried out with tetrahydrothiopyran (THTP) as the catalyst modifier. The experiments were carried out inside a nitrogen containing dry box in capped ½ gallon glass jars equipped with magnetic stirrers. The various components and their amounts used in the polymerizations are listed in Table V. The components were charged in the order: benzene, $TiCl_3 \cdot 3AlI_3$, butadiene, premixed 1 molar solutions of $AlEt_3$ and THTP.

The polymerization reaction started almost immediately after the addition of the $AlEt_3$-THTP mixture as evidenced by the viscosity increase and the heat generation noticeable after only ten minutes. Although the polymerizations had apparently gone to completion after about 3 hours as indicated by the viscosity of the reaction mixtures, the experiments were allowed to continue for 3 days at which time the catalyst was deactivated by the addition of 30 ml of a 0.2 molar solution of sodium isopropylate in isopropanol. After 0.5 g phenyl-beta-naphthylamine dissolved in 500 ml benzene had been added as an antioxidant and thoroughly mixed with the polymer, the benzene was evaporated off at room temperature and the polymer dried in vacuo at about 50°C.

From the yields and compositions of the polymers reported in Table V, it is quite clear that the addition of THTP to the basic $TiX_3 \cdot nAlI_3$-$xAlR_3$ catalyst system (Examples 36 and 37 as contrasted with Example 38) greatly promotes the formation of trans-1,4 units without the polymer yield being significantly affected.

TABLE V

EFFECT OF TETRAHYDROTHIOPYRAN (THTP) ON BUTADIENE POLYMERIZATION (100g Butadiene—1,3; 500 cc Benzene)

| Example | 36 | 37 | 38 |
|---|---|---|---|
| Catalyst | | | |
| $TiCl_3 \cdot 3AlI_3$, mg | 172[a] | 172[a] | 172[a] |
| $AlEt_3$, mg | 77 | 77 | 77 |
| THTP, mg | 255.5 | 383.3 | — |
| $AlEt_3/AlI_3$ molar ratio | 5.4 | 5.4 | 5.4 |
| $THTP/TiCl_3$ molar ratio | 20 | 30 | 0 |
| Results | | | |
| Polymer Yield, g | 84.9 | 82.9 | 87.9 |
| Polymer Mol. Wt. ×$10^{-3}$ [b] | 300 | 275 | 235 |
| Polymer Unsaturation | | | |
| Vinyl, % | 4.5 | 4.2 | 4.6 |
| Cis, % | 61.3 | 44.9 | 90.2 |
| Trans, % | 34.2 | 50.9 | 5.2 |

[a] Corresponds to 19.3 mg = 0.125 mmole $TiCl_3$
[b] According to the correlation of Johnson and Wolfangel for cis-1,4-polybutadiene, Ind. Eng. Chem., 44, 752 (1952).

Examples 39–41

Three polymerizations were carried out essentially as described in Examples 13–23 but with triisobutylaluminum (Al(i-Bu)$_3$) as the alkylmetal component and with the THT added last. The data reported in Table VI clearly demonstrate that THT promotes the formation of trans-1,4 butadiene units in the system.

TABLE VI

EFFECT OF TETRAHYDROTHIOPHENE ON BUTADIENE POLYMERIZATION

| Example | 39 | 40 | 41 |
|---|---|---|---|
| Catalyst | | | |
| $TiCl_3 \cdot 5AlI_3$, mg | 109.6[a] | 109.6 | 109.6 |
| Al(i-Bu)$_3$, mg | 99.2 | 99.2 | 99.2 |
| THT, mg | 0 | 88.2 | 220.4 |
| $THT/TiCl_3$ molar ratio | 0 | 20 | 50 |
| Al(i-Bu)$_3$/$AlI_3$ molar ratio | 2 | 2 | 2 |
| Results | | | |
| Polymer Yield, g | 12.3 | 12.0 | 1.1 166 |
| Polymer Mol. Wt. ×$10^{-3}$ | 86 | 110 | — |
| Polymer Unsaturation | | | |
| Vinyl, % | 4.0 | 3.2 | 3.4 |
| Cis, % | 87.0 | 35.9 | 27.8 |
| Trans, % | 9.0 | 60.9 | 67.8 |

[a] Corresponds to 7.71 mg = 0.05 mmole $TiCl_3$

Tables VII and VIII hereinbelow set out the physical properties of representative varying cis-trans randomly distributed polybutadiene compositions in their respective uncured and cured states:

TABLE VII.—PHYSICAL PROPERTIES OF VARYING CIS-TRANS COMPOSITION POLYBUTADIENES (UNCURED)

| Percent trans[a] unsaturation | Vis. avg. M. W. | Tensile strength in p.s.i. | Percent elongation | Percent permanent set after break | Tested at °C. | Extenders |
|---|---|---|---|---|---|---|
| 64.8 | 295,000 | 160 | > 1300 | ~ 75 | 25 | |
| 65.2 | 385,000 | 180 | > 1300 | ~ 110 | 25 | |

TABLE VII.—Continued

| Percent trans [a] unsaturation | Vis. avg. M. W. | Tensile strength in p.s.i. | Percent elongation | Percent permanent set after break | Tested at °C. | Extenders |
|---|---|---|---|---|---|---|
| 73.6 | 295,000 | 380 | 1120 | ~ 25 | 25 | |
| 73.8 | 390,000 | 610 | > 1300 | ~ 75 | 25 | |
| 73.9 | 200,000 | 240 | 490 | ~ 37 | 25 | |
| 74.7 | 275,000 | 510 | > 1300 | ~ 87 | 25 | |
| 77.2 | 360,000 | 1010 | 1080 | ~ 25 | 25 | |
| 77.2 | 360,000 | 155 | | ~ 62.5 | 65 | |
| 77.2 | 360,000 | 330 | > 1300 | ~ 125 | 65 | 20 parts.[b] Flexon 846. |
| 78.3 | 250,000 | 590 | 570 | ~ 25 | 25 | |
| 78.3 | 250,000 | 130 | | ~ 37.5 | 65 | |
| 83.4 | 260,000 | 1720 | 1000 | ~ 300 | 25 | |
| 83.4 | 260,000 | 480 | | ~ 50 | 65 | |
| 83.4 | 260,000 | 940 | 760 | ~ 125 | 65 | 20 parts Flexon. |
| 83.4 | 260,000 | 690 | 540 | ~ 125 | 65 | 20 parts Flexon. 20 parts HAF.[c] |

[a] Balance: cis-1,4 and vinyl.
[b] Flexon 846 is a paraffinic petroleum oil having properties corresponding to ASTM 4 and used for extending elastomers.
[c] HAF is a high abrasion furnace carbon black.

The compounding recipe for the polybutadienes in Table VIII was as follows:

| | Parts |
|---|---|
| Polybutadiene | 75.00 |
| Hevea Rubber (Smoked sheets) | 25.00 |
| Phenyl-β-naphthylamine | 0.50 |
| ZnO | 5.00 |
| Stearic Acid | 2.00 |
| Benzothiazyl disulfide | 1.00 |
| Bismuth Dimethyldithiocarbamate | 0.50 |
| Sulfur | 0.35 |

This material was cured for 60 minutes at 141°C.

TABLE VIII

Physical Properties of Varying cis-trans Composition Polybutadienes (Cured)

| % trans 1,4 Unsaturation | Viscosity Avg. M. W. | Tensile Strength psi | % Elongation | Tested at °C. |
|---|---|---|---|---|
| 64.8 | 295,000 | 1240 | 460 | 25 |
| 73.6 | 295,000 | 1400 | 810 | 25 |
| 78.2 | 275,000 | 1140 | 800 | 25 |
| 78.3 | 250,000 | 2000 | 830 | 25 |
| 80.4 | 235,000 | 1450 | 850 | 25 |
| 83.4 | 260,000 | 2060 | 850 | 25 |

Further advantages of this invention will be apparent to those skilled in the art. Polymers of conjugated dienes that are readily sulfur curable can be conveniently and efficiently prepared with the catalyst system of the present invention. It is understood that this invention is not limited to specific examples set forth herein, which have been offered merely as illustration, and that modifications may be made without departure from the spirit and scope of the appended claims.

What is claimed is:

1. A hydrocarbon-soluble catalyst system for the polymerization of conjugated diolefins consisting of:
   a. $TiX_3 \cdot nAlI_3$ wherein X is a halogen selected from the group consisting of chlorine, bromine and iodine and $n$ is a number from 1 to about 20;
   b. an organo aluminum compound selected from the group consisting of (1) trialkyl aluminum and (2) a mixture of trialkyl aluminum and dialkyl aluminum halide; where the ratio of organo aluminum to $AlI_3$ is from 5:1 to 1:1; and
   c. a Lewis base, selected from the group consisting of tetrahydrothiophene, tetrahydrofuran, tetrahydrothiopyran, tetrahydropyran and 2,5-dimethyltetrahydrofuran, where the ratio of base to $TiX_3$ is from 1:1 to 500:1.

2. The catalyst system of claim 1 wherein the $TiX_3 \cdot nAlI_3$ is $TiCl_3 \cdot nAlI_3$.

3. The catalyst system of claim 1 wherein the organo aluminum compound is an aluminum trialkyl.

4. The catalyst system of claim 1 wherein the organo aluminum compound is aluminum triethyl.

5. The catalyst system of claim 1 wherein the organo aluminum compound is aluminum triisobutyl.

6. The catalyst system of claim 1 wherein the mole ratio of the organo aluminum to $AlI_3$ is between 3:1 and 1.4:1.

* * * * *